No. 709,714. Patented Sept. 23, 1902.
H. W. LEONARD.
METHOD OF CONTROLLING THE ENERGY DELIVERED TO ELECTRICAL TRANSLATING DEVICES.
(Application filed Jan. 31, 1896.)
(No Model.)
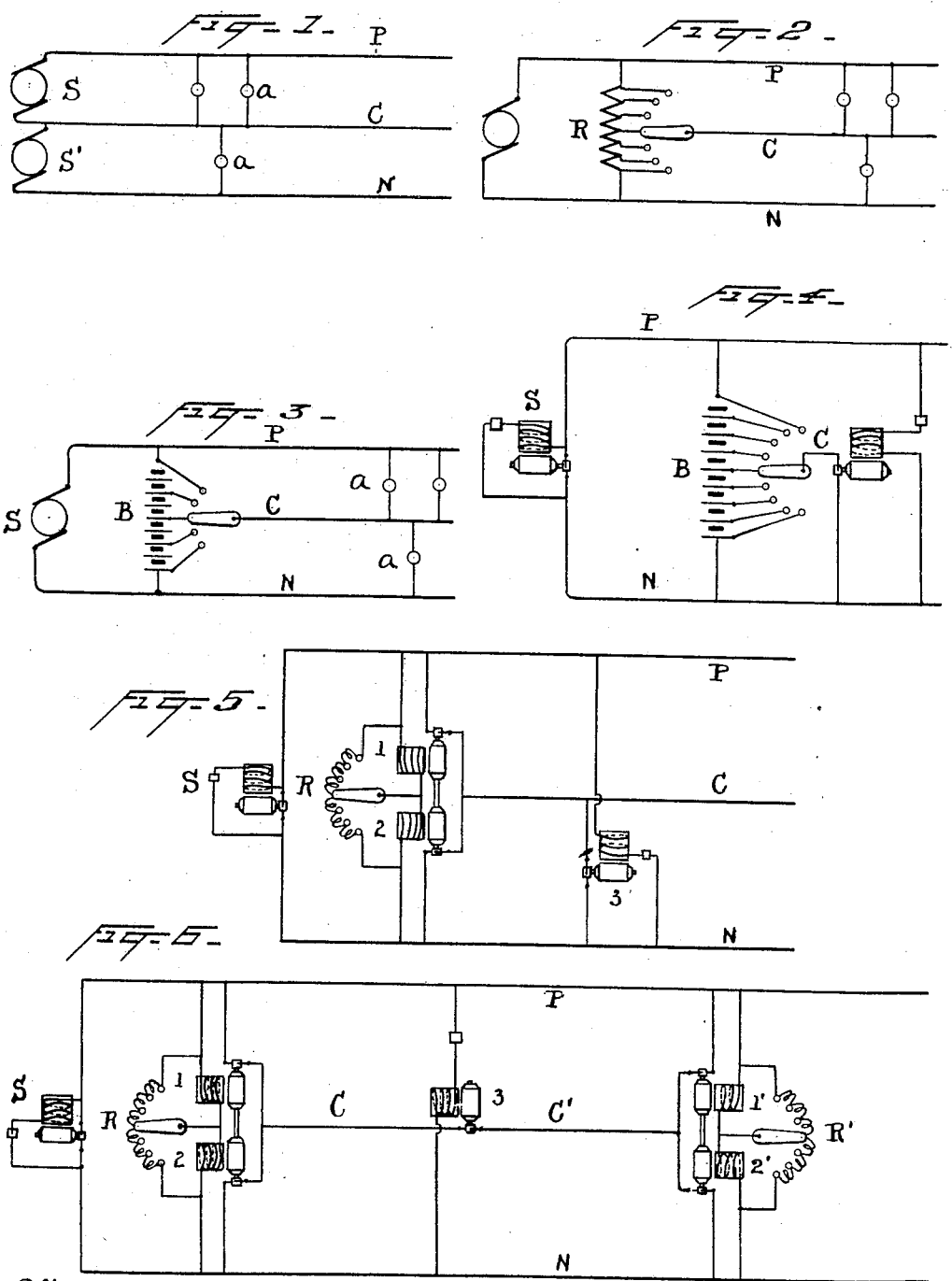

UNITED STATES PATENT OFFICE.

HARRY WARD LEONARD, OF EAST ORANGE, NEW JERSEY.

METHOD OF CONTROLLING THE ENERGY DELIVERED TO ELECTRICAL TRANSLATING DEVICES.

SPECIFICATION forming part of Letters Patent No. 709,714, dated September 23, 1902.

Application filed January 31, 1896. Serial No. 577,520. (No model.)

*To all whom it may concern:*

Be it known that I, HARRY WARD LEONARD, a citizen of the United States, residing at East Orange, in the county of Essex and State of New Jersey, have invented a certain new and useful Improvement in Methods for Controlling the Energy Delivered to Electrical Translating Devices, of which the following is a specification.

My invention relates to systems of electrical distribution, and more especially to systems in which a practically constant electromotive force exists between the supply-conductors and from which conductors energy must be taken for operating devices requiring at times a different electromotive force from that upon the supply-conductors.

The principal object of my invention is to furnish an improved method and means for producing at will upon the terminals of the translating devices any electromotive force with the least possible waste of energy. This makes it necessary that the number of watts taken from the source of supply be practically the same as that absorbed by the translating device or devices in use.

For incandescent lamps and similar devices which cannot commercially be made higher than a certain voltage the cost of supply-conductors for operating them at a distance becomes uncommercially high unless the electric energy is transmitted at a voltage higher than that of the lamps. A constant-electromotive-force multiple-arc system is best both for the transmission and for the circuits to which the translating devices are connected. With the alternating systems this conversion of the energy from a higher to a lower voltage is readily accomplished by means of the well-known converters; but electric energy in this form is not adapted to the operation of the best forms of motors, which require a continuous current, nor for storage batteries, electrolytic work, and many other uses.

In the accompanying drawings, Figures 1, 2, 3, and 4 illustrate old methods of supplying translating devices with an electromotive force different from that upon the main supply-conductors, and Figs. 5 and 6 illustrate my improved method of accomplishing this result.

The Edison three-wire system is one familiar example of the method of securing the advantages of a higher electromotive force than that of the translating devices for the transmission and securing without waste lower electromotive forces controllable at will and practically constant independent of the current. This system is illustrated in Fig. 1 of the drawings, in which S and S' are two generators connected in series and from which extend the main positive and negative wires P and N, and from between the two machines extends the neutral or compensating conductor C. If the electromotive force of each of the generators S and S' is one hundred volts, the total electromotive force across the outside conductors P and N will be two hundred volts, and the translating devices $a$, connected between the outside conductors and the neutral conductor—that is, two in series—will each receive an electromotive force of one hundred volts, as is well understood.

In a modification of the Edison three-wire system which is illustrated in Fig. 2 of the drawings, a rheostat R is placed across the outside conductors P and N, which rheostat is constantly in circuit. It will be evident that the potential along the conductor in this rheostat would depend upon the current flowing and the ohms the current had passed through. In this arrangement only one main generator S is necessarily employed, and this generator, we will assume, produces an electromotive force of two hundred volts. Hence there would be a difference of potential across the outside conductors of two hundred volts. The handle of the rheostat is connected to the neutral or compensating conductor C, and if we place translating devices $a$ between the outside conductors and the compensating conductor an electromotive force of one hundred volts could be maintained at the terminals of the translating devices, as by moving the handle of the rheostat to vary the resistance in circuit on either side of the compensating conductor there could be maintained upon the conductor C any potential desired intermediate between that of P and N. In practice with one-hundred-volt incandescent lamps the potential upon the conductor C would be so maintained that the electromotive force between the conductors P and C and C and N would be one hundred volts; but this method involves a decided loss of energy, and another decided objection is that since the potential of the conductor C depends upon the drop of potential in the conductor of the rheostat, which in turn depends upon the relative number of amperes on the two sides of the system, it will be evident that more than one-half of the total energy would be wasted in case all the translating devices were connected between the conductor C and one of the outside conductors.

Another method of securing the benefit of high constant electromotive force available at the translating devices at a lower constant electromotive force as heretofore proposed is illustrated in Fig. 3, in which S is the source of constant electromotive force, and B is a storage battery connected across the outside conductors P and N, and C is the compensating conductor. By connecting the conductor C at various points along the storage battery any desired constant electromotive force from zero to the full electromotive force between P and N can be obtained at the terminals of the translating devices. By moving the connection of the conductor C along the battery B the electromotive force upon the translating devices while constant so far as being affected by the current is concerned could be made variable at will without the waste of power incidental to the use of the idle resistance illustrated in Fig. 2 and without the variation in electromotive force due to the amount of current flowing. A similar arrangement is illustrated in Fig. 4, the field-magnet of the motor $a$ being connected across the outside conductors, so as to have a constant field of full strength, and the armature is connected between the conductor C, extending from the storage batteries B and the outside conductor N. This method is illustrated in Figs. 4 and 5 of my Patent No. 478,344, dated July 5, 1892, and a somewhat similar arrangement is illustrated in my Patent No. 476,544, dated June 7, 1892.

My present invention consists principally in substituting dynamo-electric rotary transformers for the storage batteries in Figs. 4 and 5 of my Patent No. 478,344, above referred to.

In Fig. 5 of the accompanying drawings my invention is illustrated in its simplest form. In that figure, S represents the source of constant electromotive force provided with a rheostat for controlling the electromotive force produced. From this source extend the main conductors P and N. Across the circuit P N, I place two dynamo-electric machines 1 and 2 of the ordinary type—that is, such as would be adapted to be operated by being connected in shunt across the circuit P N. These two machines have their armatures mechanically connected together and electrically in series across the circuit P N, and their field-magnets are also connected in series across this circuit. The field-magnets of these machines are shunted by a rheostat R of high resistance, the contact-lever of which is connected between the field-circuit of the two machines. If the contact-lever of this rheostat is at its central position, the field-magnets of both machines will be equally excited, and since each field is wound to be excited by the full electromotive force of the source S the current through each of the field-magnets under such conditions will be one-half the full exciting-current. The armatures of these machines being in series with each other will receive a current and will run at such a speed that their combined counter electromotive force will be practically equal to that of the source S—that is, both machines will each produce a counter electromotive force one-half of that of S, and to do this with a field of about one-half strength they must run at about their full speed. The translating device 3, which is illustrated as a motor and upon the terminals of which it is desired to obtain a variable electromotive force, is connected in a circuit C, extending from the armature-circuit of machines 1 and 2 intermediate the two machines to the outside conductor N, the field-magnet of the motor being connected across the circuit P N. The conductor C has a potential which is intermediate between that of P and N, as in the arrangement illustrated in Figs. 1, 2, and 3. The potential upon the conductor C can be varied at will by varying the electromotive force produced by the armatures of the machines 1 and 2, and this variation is accomplished by varying the field strength of those machines by means of the rheostat R. Since the armatures of the machines are mechanically connected together, their speeds must be equal, and since they are electrically connected in series their total electromotive force will always be approximately equal to that of the main source S; but the electromotive force of either may be varied from zero to approximately the full electromotive force of S. This is accomplished by adjusting the contact-arm of the rheostat R from one extreme position to the other, whereby the field of either machine may be short-circuited and the other will receive the full electromotive force of the line. When the electromotive force of either of the machines 1 and 2 is zero, the electromotive force of the other will be approximately that of the line, so that it is evident that by adjusting the contact-lever of the rheostat any desired potential can be obtained upon the conductor C from the potential of P to that of N, and hence any desired electromotive force between the conductors C and N from zero to that between P and N, and in the case of an electric motor whose armature is connected between the conductors C and N, with its field constant across the main-line conductors P and N, it is evident that there may be delivered upon the terminals of the armature of that machine any electromotive force from zero to approximately that of the source S. Hence the motor 3 can be run from rest to full speed without the use of rheostats or other wasteful controlling devices.

As an illustration, let it be assumed that the electromotive force of the source S is five hundred volts and that the machines 1, 2, and 3 are each wound to stand an electromotive force of five hundred volts and one hundred amperes and that the contact-arm of the rheostat R is in the position at which the field-magnet of the machine 2 is short-circuited and that consequently there is no electromotive force between the conductors C and N and the motor 3 will be at rest. If now it is desired to start the motor 3 and run it at its highest speed and assuming that for starting the motor there are required one hundred amperes through the armature and fifty volts at its terminals, the contact-arm of rheostat R is moved gradually away from the starting position until the distribution of electromotive forces and currents will be as follows, neglecting for the sake of simplicity the slight mechanical and electrical losses in the field-magnets and armatures and at the bearings due to conversion of energy into heat: From the line P there will flow ten amperes, the armature of the machine 1 having an electromotive force of four hundred and fifty volts and the armature of the machine 2 will have an electromotive force of fifty volts—that is, the same electromotive force as the armature of the motor 3. The field-magnet of the machine 1 not being at full strength, the armature of that machine will tend to run faster, but cannot, owing to the fact that it is opposed by the production of current in the machine 2, which current is supplied to the motor 3 in the local closed loop composed of conductors C and N and the armatures of machines 2 and 3. The four thousand five hundred watts (four hundred and fifty volts multiplied by ten amperes) absorbed by the machine 1 are transformed into mechanical power in the shape of speed and torque in the shaft joining the armatures of 1 and 2 and reappear as electrical energy in the armature of 2 in the form of fifty volts and ninety amperes, equaling four thousand five hundred watts. The ten amperes from the line after passing through the armature of the machine 1 join with the ninety amperes produced by the machine 2 as a generator, and the total of one hundred amperes at fifty volts is supplied to the armature of the motor 3. Thus it will be seen that by the use of ten amperes from the five-hundred-volt line we operate at one-tenth speed a motor requiring one hundred amperes. By the methods of series-parallel control heretofore employed at least fifty amperes from the line would be required instead of ten. If now the contact-arm of the rheostat is gradually moved to the other extreme position, so that the field-magnet of the machine 2, if fully excited and that of the machine 1 is short-circuited, the electromotive force upon the terminals of the motor 3 will be gradually increased up to the full-line pressure of five hundred volts—that is to say, machine 1 will absorb practically no volts from the source S, and the full electromotive force of source S will be applied to the armature of machine 3, and at this time the armature of machine 2 will have no current passing through it except such as is necessary to overcome friction in a field of full strength. If the torque of the motor 3 be practically constant, as in the case of an electric locomotive slowly accelerated upon a constant grade, the amperes required would be the same for the slow speed and full speed. At full speed there would be one hundred amperes passing through the machines 1 and 3 in series and practically no current through the machine 2. If now it is desired to bring the locomotive to rest, the contact-arm of the rheostat is gradually moved to an opposite position to weaken the field of the machine 2. The momentum will cause the motor 3 to continue for an instant at full speed, and since that machine has a constant field its electromotive force will continue constant for the same period, and the electromotive force of the machine 2 falls rapidly, due to its weakened field, and hence the motor 3 becomes a generator, supplying current to the armature of the machine 2 in a field which is growing weaker. The weakening of the field of the machine 2 tends to cause the armature of that machine to increase in speed; but in doing so it is met with opposition due to the revolution of the armature of the machine 1 in a field of increasing strength, which causes a development of volts by the machine 1, which are added to the volts produced by the machine 3, and hence exceed the line-volts and cause a current to flow back onto the line. This condition continues in a decreasing degree until the machine 3 produces no volts, and therefore the machine 2 will have no volts upon its terminals, and hence the machine 1 will have five hundred volts upon its terminals, which means that the machine 3 will be at rest. Thus the energy represented by a moving body driven by an electric motor by my improved method can be utilized and fed back onto the line as useful electric energy instead of being wasted, as heretofore. The amount of energy fed onto the line in this way is greater when the contact-lever of the rheostat is first thrown over and while the speed of momentum of the locomotive is greatest, and as the speed and momentum decrease the amount of current fed back onto the line decreases. This makes a very rapid but extremely smooth stop. The acceleration of a body from rest to full speed is similarly quite rapid and very smooth.

From the foregoing it will be seen that the function and performance of the rotary transformers 1 and 2 are quite similar to that of the storage batteries shown in my Patent No. 478,344, except that in the present case one terminal of the motor must necessarily be connected to a conductor whose potential remains practically fixed, whereas in my said patent the potential upon each brush is variable over the entire range of potential, permitting the reversal of the motor and its operation to full speed in the opposite direction, which cannot be done in my present arrangement of apparatus as illustrated in Fig. 5.

To enable the reversal of the working motor 3 by my present invention, I employ two sets of rotary transformers, as shown in Fig. 6, the additional set being represented by the machines 1' and 2' and the regulating-rheostat R'. In this arrangement the terminals of the working motor 3 are connected to the conductors C and C', extending from the armature-circuits intermediate the two machines of each set. By manipulating the contact-arms of the two rheostats any potential from that of P to that of N can be obtained upon the conductors C and C'. Therefore it is evident that upon the terminals of the working motor 3 any difference of potential—that is, any electromotive force from zero up to the full electromotive force of the source S—can be had and in either direction.

Let it be supposed that the potential on the conductor P is five hundred volts and that the potential on conductor N is zero and that the contact-arms of rheostats R and R' are placed, as shown in Fig. 6, so that the counter electromotive force of the armatures 1 2 and 1' 2' are each two hundred and fifty volts. The potential upon conductor C will then be two hundred and fifty volts and the potential upon the conductor C' will also be two hundred and fifty volts, and consequently there will be no difference of potential—that is, electromotive force—upon the armature-terminals of the machine 3, and consequently that armature will be at rest. If now the contact-arm of rheostat R' is moved in a direction to strengthen the field of machine 2' and simultaneously weakening the field of machine 1', it is evident that the potential upon the conductor C' will move away from that of the conductor N and toward that of the conductor P. The potential upon the conductor C' will now be higher than the potential upon the conductor C, and this difference of potential between the conductors C and C' will cause a current to flow through the local loop including the armatures of machines 2', 3, and 2, and the armature of machine 3 will rotate in a certain direction according to its field-winding. If now the original condition of Fig. 6 is assumed—that is, with the armature of machine 3 at rest—and then the contact-arm of the rheostat R be moved so as to strengthen the field of machine 2 while simultaneously weakening the field of machine 1, the current flowing in the local loop just referred to will be in the reverse direction and the armature of machine 3 will rotate in the opposite sense from that just stated. It will be evident that by manipulating rheostat R' the potential upon the conductor C' can be made to gradually approach the potential of either P or N, and similarly by manipulating the rheostat R the potential upon the conductor C can independently be made to approach the potential of either conductor P or N, and that therefore by this manipulation of rheostats R and R' the full electromotive force between the conductors P and N can be applied in either sense upon the terminals of the armature of machine 3, so that the speed of that armature can be controlled from rest to full speed in either direction of rotation.

I do not claim herein the apparatus or system of electrical distribution herein shown and described, since that part of my invention is made the basis of a divisional application.

What I claim is—

1. The method of reversing the direction of current through a translating device, consisting in connecting the terminals of the translating device with two conductors of constant but different potential, developing an electromotive force between the translating device and one of the said conductors, and varying the said electromotive force so that the potential at one terminal of the translating device can be made higher or lower than the potential at the other terminal, whereby the current through the translating device will be reversed.

2. The method of reversing the direction of current through a translating device, consisting in connecting the terminals of the translating device between two conductors which are electrically connected with a source of electromotive force, and varying by magnetic induction the relative potential of the two conductors independent of and without altering the connections with the source so that the potential of one of them is made to become higher or lower than that of the other, whereby the current through the translating device is reversed.

3. The method of reversing the direction of rotation of an electric motor, consisting in connecting the terminals of the motor-armature between two conductors which are electrically connected with a source of electromotive force, and varying the relative potential of the two conductors independent of and without altering the connections with the source so that the potential of one of them is made to become higher or lower than that of the other, whereby the current through the motor-armature is reversed.

4. The method of controlling the energy delivered to a translating device, consisting in connecting the terminals of the translating device beween two conductors which are electrically connected with a source of electromotive force, varying by magnetic induction the potential upon either or both of said conductors to vary the electromotive force at the terminals of said translating device, and varying the potential upon said conductors so that the potential upon either of them may be made to become higher or lower than the potential upon the other conductor, whereby the current through the translating device will be reversed.

5. The method of controlling the energy delivered to an electric motor, consisting in connecting the armature-terminals of the motor between two conductors which are electrically connected with a source of electromotive force, varying by magnetic induction the potential upon either or both of said conductors to vary the electromotive force at the armature-terminals of said motor, and varying the potential upon said conductors so that the potential upon either of them may be made to become higher or lower than the potential upon the other conductor, whereby the current through the motor-armature will be reversed.

6. The method of reversing the direction of current through a translating device, consisting in connecting the terminals of the translating device with the terminals of a source of electromotive force and developing in series with the translating device between it and the source by means of a second source of electromotive force, a variable counter electromotive force which can be varied from an electromotive force lower than the effective electromotive force in the circuit of the translating device to an electromotive force higher than the effective electromotive force in the circuit of the translating device, or vice versa, whereby the direction of the current through the translating device is reversed.

7. The method of reversing the direction of current through a translating device consisting in developing between the source and the translating device, an electromotive force counter to that of the source and varying that electromotive force so that the current through the translating device is reversed.

8. The method of reversing the direction of current through a translating device connected in a circuit in which there are two opposing electromotive forces which consists in varying one of the electromotive forces from an amount below to an amount above the electromotive force of the other, whereby the direction of the current through the translating device is reversed.

9. The method of reversing the direction of current through an electric motor-armature consisting in developing in the circuit of the motor-armature in series with it and the source, an electromotive force counter to that of the source, and which can be varied over a range sufficient to cause the current through the motor-armature to reverse.

10. The method of reversing the direction of current through a translating device, consisting in developing in series with the translating device and the source two independent electromotive forces and varying said two electromotive forces relative to each other to cause the direction of current through the translating device to reverse.

11. The method of reversing the current through a translating device connected between two conductors of variable potential, consisting in supplying to said conductors currents of variable potential by means of two independent sources of electromotive force which are electrically connected together, and varying the potential upon one of said conductors from a potential less than, to a potential greater than the potential of the other conductor, or vice versa.

12. The method of reversing the current through a translating device connected between two constant potentials, consisting in developing two variable potentials intermediate the first-named potentials and electrically connected therewith and connecting the translating device between these two points of intermediate potential and then varying the potential of said intermediate potentials relative to each other until they are equal and then continuing the relative variation, whereby the current is reversed.

13. The method of varying the current through a translating device consisting in developing in series with a source and the translating device, an electromotive force counter to the electromotive force of the source and variable from an amount less than the electromotive force of the source to an amount greater than that of the source.

14. The method of varying the current through the armature of an electric motor, consisting in developing in series with a source and said armature, an electromotive force counter to the electromotive force of the source and variable from an amount less than the electromotive force of the source to an amount greater than that of the source.

15. The method of reversing the current through a translating device consisting in producing two divided sources of electromotive force and connecting the translating device between the two points of division and then varying the potential at the points of division relative to each other to reverse the current through the translating device.

16. The method of reversing an electric motor, consisting in developing in a circuit two points of potential independently of the source of electromotive force, connecting between said two points of potential the element of the motor to be reversed, and varying the potential at one or both of said points so that the potential at one point will be higher than at the other point, thereby producing a flow of current in either direction from the point of higher to the point of lower potential.

This specification signed and witnessed this 29th day of January, 1896.

H. WARD LEONARD.

Witnesses:
EUGENE CONRAN,
JOHN R. TAYLOR.